United States Patent Office 3,294,840
Patented Dec. 27, 1966

3,294,840
**PRODUCTION OF DIHYDRODICYCLOPENTA-
DIENYLAMINE**
Ludwig Schuster and Paul Raff, Ludwigshafen (Rhine), Germany, assignors to Badische Anilin- & Soda-Fabrik Aktiengesellschaft, Ludwigshafen (Rhine), Germany
No Drawing. Filed Nov. 4, 1964, Ser. No. 408,737
Claims priority, application Germany, Nov. 22, 1963,
B 74,354
8 Claims. (Cl. 260—563)

This invention relates to a new process for the production of dihydrodicyclopentadienylamine.

It is known that dihydrodicyclopentadienylamine can be prepared by hydrolyzing dihydrodicyclopentadienyl isothiocyanate or reducing it with zinc and hydrochloric acid or by treating dicyclopentadiene with sulfamic acid. When dihydrodicyclopentadienyl isothiocyanate is hydrolyzed, yields of about 50% of the theory are obtained with reference to dicyclopentadiene. For reduction with zinc and hydrochloric acid, which cannot be carried out continuously, yields are not stated. In both cases dihydrodicyclopentadienyl isothiocyanate may be prepared in a separate stage. In the reaction of dicyclopentadiene with sulfamic acid or sulfamide, the yield of dihydrodicyclopentadienylamine is also only about 70% of the theory.

It is an object of this invention to provide a new process for the production of dihydrodicyclopentadienylamine. It is another object of the invention to provide a process by which dihydrodicyclopentadienylamine can be prepared in higher yields than according to the prior art methods. These and other objects and advantages will be evident from the following detailed description and example.

We have found that dihydrodicyclopentadienylamine can be obtained advantageously from dicyclopentadiene by allowing dicyclopentadiene and hydrocyanic acid to act on each other in the presence of concentrated sulfuric acid at a temperature of from −5° to +35° C., preferably from +5° to +15° C., the hydrocyanic acid being used in at least three times and preferably five to twenty times the molar amount with reference to dicyclopentadiene and the sulfuric acid in up to three times and preferably 1.5 to 3 times molar excess, also with reference to dicyclopentadiene, and saponifying the resultant N-dihydrodicyclopentadienyl formamide in a conventional way.

Production of amines by reaction of olefins with hydrocyanic acid in the presence of sulfuric acid and subsequent saponification of the N-substituted formamides thus obtained is known as the Ritter reaction. The reaction of diolefins by the Ritter reaction has also already been described a number of times. Thus 1,8-diamino-p-methane is obtained according to U.S. Patent No. 2,632,022 from limonene and two to three moles of hydrocyanic acid in the presence of 1.5 to 5 moles of sulfuric acid. U.S. Patent No. 2,632,023 describes a process for the production of 2,5-diamino-2,5-dimethylhexane according to which 2,5-dimethylhexadiene-(1,5) is reacted with 2 to 3 moles of hydrocyanic acid in the presence of 1.5 to 5 moles of sulfuric acid. Finally in U.S. Patent No, 3,068,286 a method is described according to which a diamine is obtained from 4-vinylcyclohexene-(1) and hydrocyanic acid, water and sulfuric acid in the ratio 1:3:3:3. A cyclohexanol bearing an alkylamino group as a substituent is also formed. In this case also, both olefinic double bonds have reacted.

It is surprising that in the process according to the present invention, only one of the two olefinic double bonds is attacked although the reaction conditions are comparable with those used in the above mentioned methods. The second olefinic double bond thus remains intact in spite of the large excess of hydrocyanic acid.

It is important that at least 3 moles of hydrocyanic acid (i.e. liquid hydrogen cyanide) is used for each mole of dicyclopentadiene. When the excess is less than this, the yields are considerably lower. The optimum amount of hydrocyanic acid is from 5 to 20 moles per mole of dicyclopentadiene. Larger amounts of hydrocyanic acid may naturally be used, but such use is not attended by any particular advantage.

Concentrated sulfuric acid, i.e. 80 to 100% sulfuric acid, is used in the process according to this invention. Particularly good results are achieved with 85 to 95% sulfuric acid.

It is important that sulfuric acid be used in an excess of up to 3 moles. With a molar deficiency of sulfuric acid, the reaction remains incomplete; with a larger excess than 3 moles, secondary reactions take place in a rapidly increasing degree.

The process according to the invention may be carried out for example by placing the sulfuric acid and hydrocyanic acid in a reactor and slowly adding the dicyclopentadiene to the mixture while mixing intensely. The process may for example be carried out batchwise in a vessel fitted with a stirrer or continuously in an apparatus suitable for continuous operation, for example a cascade of vessels having stirrers and an overflow or circular tube systems. Heat of reaction liberated during the reaction is removed by suitable cooling means. When all of the dicyclopentadiene has been supplied to the reaction mixture, the latter is advantageously kept for some hours with gentle stirring at the reaction temperature or at room temperature or, in the case of continuous operation, in a residence chamber.

The reaction mixture is processed by conventional methods, for example by adding water, distilling off the excess hydrocyanic acid, saponifying the substituted formamide and isolating the amine. It is advantageous to add water in an amount which is one to six times the weight of the sulfuric acid originally present. After the hydrocyanic acid has been distilled off, the residue is heated under reflux until the N-dihydrodicyclopentadienyl formamide has been saponified. The amine may be recovered from the saponification mixture by adding sufficient alkali metal or alkaline earth metal hydroxide, if desired in dissolved condition, to make the mixture alkaline. The amine separates as an oil and may be separated in a conventional way.

Dihydrodicyclopentadienylamine is known to be a valuable intermediate for further reactions, for example for the production of quaternary ammonium bases or plant protection agents.

The following example, in which parts are by weight, will further illustrate the invention.

*Example*

A mixture of 213 parts of 92% sulfuric acid and 410 parts of hydrocyanic acid is placed in a vessel fitted with a high speed stirrer. While stirring intensely, 132 parts of dicyclopentadiene is added to the mixture at 5° C., the temperature of 5° C. being maintained by external cooling. A clear yellow solution is formed and this is stirred at 5° C. to 20° C. for another three hours. It is then diluted with 1,000 parts of water and the excess hydrocyanic acid is distilled off. The temperature of the mixture is 105° C. Substituted formamide separates at first but passes into solution again and is saponified to the amine or its sulfuric acid salt and formic acid. The clear yellow solution is then cooled and excess caustic soda solution is added at 25° C. The amine which separates is removed and the mother liquor is extracted with ether. The amine and ether solution are united, dried and the ether distilled off therefrom. By distilling the residual crude amine, 133 parts of amine having a boiling point of 111.5° C. to 113° C. (21 mm.) and an amine number of 370 is obtained. The yield is thus equivalent to 89% of the theory.

We claim:

1. A process for preparing dihydrodicyclopentadienylamine which comprises reacting dicyclopentadiene and hydrocyanic acid in concentrated sulfuric acid with a molar ratio of hydrocyanic acid to dicyclopentadiene of at least 3:1 and a molar excess of sulfuric acid not exceeding a triple molar excess with reference to cyclopentadiene at a temperature of from −5° to +35° C., and saponifying the resultant N-dihydrodicyclopentadienyl formamide.

2. A process as claimed in claim 1 wherein said temperature is in the range of 5° to 15° C.

3. A process as claimed in claim 2 wherein said molar amount of hydrocyanic acid is from five to twenty times the molar amount with reference to said dicyclopentadiene.

4. A process as claimed in claim 2 wherein said molar amount of sulfuric acid is 1.5 to 3 times the molar amount of said dicyclopentadiene.

5. A process as claimed in claim 1 wherein said molar amount of hydrocyanic acid is from five to twenty times the molar amount with reference to said dicyclopentadiene.

6. A process as claimed in claim 5 wherein said sulfuric acid is of 85 to 95% strength.

7. A process as claimed in claim 1 wherein said molar amount of sulfuric acid is 1.5 to 3 times the molar amount of said dicyclopentadiene.

8. A process as claimed in claim 7 wherein said sulfuric acid is of 85 to 95% strength.

References Cited by the Examiner

UNITED STATES PATENTS

| 2,632,022 | 3/1953 | Bortnick et al. | 260—563 |
| 2,831,027 | 4/1958 | Pfister et al. | 260—563 |

OTHER REFERENCES

Arthur et al., "Journal American Chemical Society," volume 76, pp. 5364–7 (1954).

CHARLES B. PARKER, *Primary Examiner.*

ROBERT V. HINES, *Assistant Examiner.*